United States Patent
Yue et al.

(10) Patent No.: US 11,247,913 B2
(45) Date of Patent: Feb. 15, 2022

(54) METHOD FOR PRODUCING CALCIUM ZINCATE

(71) Applicant: CHONGQING DONGQUN TECHNOLOGY CO., LTD., Chongqing (CN)

(72) Inventors: Huiwei Yue, Chongqing (CN); Shichuan Li, Chongqing (CN); Zhongxiang Long, Chongqing (CN); Tao Jiang, Chongqing (CN); Quanfeng Liu, Chongqing (CN)

(73) Assignee: CHONGQING DONGQUN TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 17/146,475

(22) Filed: Jan. 11, 2021

(65) Prior Publication Data

US 2021/0130184 A1 May 6, 2021

Related U.S. Application Data

(63) Continuation of application No. PCT/CN2019/085932, filed on May 8, 2019.

(30) Foreign Application Priority Data

Jul. 24, 2018 (CN) .......................... 201810817320.4
Jul. 26, 2018 (CN) .......................... 201810832651.5

(51) Int. Cl.
  *C01G 9/00* (2006.01)
  *C22B 3/14* (2006.01)

(52) U.S. Cl.
  CPC .............. *C01G 9/006* (2013.01); *C22B 3/14* (2013.01); *C01P 2004/64* (2013.01); *C01P 2006/80* (2013.01)

(58) Field of Classification Search
  CPC ....... C01G 9/006; C22B 3/14; C01P 2004/64; C01P 2006/80

USPC .......................................................... 423/105
  See application file for complete search history.

(56) References Cited

U.S. PATENT DOCUMENTS 5,460,899 A   10/1995   Charkey

FOREIGN PATENT DOCUMENTS

| CN | 1276343 A | 12/2000 |
|---|---|---|
| CN | 1397498 A | 2/2003 |
| CN | 1595688 A | 3/2005 |
| CN | 101288821 A | 10/2008 |
| CN | 102774873 A | 11/2012 |
| CN | 102849783 A | 1/2013 |
| CN | 104294041 A | 1/2015 |
| CN | 106115767 A | 11/2016 |
| CN | 106277029 A | 1/2017 |
| CN | 106277030 A | 1/2017 |

OTHER PUBLICATIONS

Abstractor JP 72038754 B. (Year: 1972).*
Abstract of CN-108862367 A. (Year: 2018).*
International Search Report of PCT Patent Application No. PCT/CN2019/085932 dated Aug. 2, 2019.

* cited by examiner

*Primary Examiner* — Steven J Bos

(57) ABSTRACT

Provided is a method for producing calcium zincate. The method comprises: an extraction step: mixing a ground zinc-containing raw material with an extracting agent, followed by filtration to obtain an extract, wherein the extracting agent is a mixed aqueous solution of ammonia and $\{NH_4HCO_3$ and/or $(NH_4)_2CO_3\}$; optionally, purifying the extract; a decarburization step: adding calcium oxide and/or calcium hydroxide to the extract, stirring, and filtering to obtain a first solid and a first filtrate; a calcium zincate synthesis step: adding calcium hydroxide and/or calcium oxide to the first filtrate, stirring to react, and filtering to obtain a second solid and a second filtrate; optionally, rinsing the second solid with water; a drying step: drying the second solid to obtain the final calcium zincate product.

15 Claims, No Drawings

METHOD FOR PRODUCING CALCIUM ZINCATE

CROSS-REFERENCE TO RELATED APPLICATIONS

This application is a continuation application of International Patent Application No. PCT/CN2019/085932 filed on May 8, 2019, which claims the benefit of Chinese Patent Application No. 201810817320.4 filed on Jul. 24, 2018 and Chinese Patent Application No. 201810832651.5 filed on Jul. 26, 2018, all of which are incorporated herein by reference in their entireties.

TECHNICAL FIELD

The invention relates to the technical field of inorganic chemicals. It relates to a method for producing calcium zincate, in particular to a method for producing calcium zincate using low-grade zinc oxide ore.

BACKGROUND ART

Calcium zincate has a wide range of uses. Using calcium zincate as the negative electrode material of alkaline secondary zinc electrodes is a new direction in recent years. It is being matured and industrialized. Compared with traditional zinc oxide desulfurizers, a desulfurizer at room temperature which uses calcium zincate as the desulfurization active component has greatly increased sulfur capacity. Calcium zincate as a feed additive is not only good for animal absorption, but also good for reducing environmental pollution. Calcium zincate can also be widely used in glazes, paints, coating additives, etc.

The preparation method of calcium zincate in the prior art is limited to experimental exploration and is not yet mature. For example, Chinese patent publication CN1397498A and CN1595688A both disclose a method for synthesizing calcium zincate by ball milling. Among them, Chinese patent publication CN1397498A discloses that $Ca(OH)_2$ and $ZnO$ are placed into a ball milling tank according to the ratio in the chemical formula of calcium zincate, and appropriate amount of water is added; with 8-18 hours of ball milling under the protection of argon atmosphere and 10-15 hours of baking at 30-80° C., the product is obtained. U.S. Pat. No. 5,460,899 discloses a method of generating calcium zincate with $ZnO$ and $Ca(OH)_2$ in alkaline liquid. Chinese patent CN2012100305744 discloses that calcium zincate is generated from emulsion prepared from soluble zinc salt and stoichiometric ratio of $Ca(OH)_2$. The above methods require finished high-purity zinc oxide or finished zinc salt as the starting material, which are expensive; further, the methods have harsh reaction condition, high energy consumption, incomplete reaction, low yield, poor reaction specificity, and the reactions are easily interfered by impurities. The costly overall preparation processes are not suitable for industrial applications.

Calcium zincate products are widely used and have remarkable market prospects. However, there is currently a lack of industrially mature and stable production methods. On the other hand, China's zinc mines are generally of low grade, and low-grade mining tailings and beneficiation tailings are stockpiled in large quantities. The previous processes, such as fire method, sulfuric acid leaching method, calcium chloride method, ammonium chloride method, ammonia heat evaporation method, etc., have problems such as high energy consumption, heavy pollution, high cost, etc., so that the zinc-containing products (such as calcium zincate) cannot be economically and effectively produced using low-grade zinc ore. It can be observed that due to the limitations of the prior technology, the market demand is difficult to meet.

SUMMARY OF THE INVENTION

The Problems to be Solved by the Invention

The preparation method of calcium zincate in the prior art is limited to experimental exploration, and high-purity finished zinc oxide or zinc salt is required as raw materials. The methods have harsh reaction condition, and are easily interfered by impurities, while the yield is poor. Thus, these methods are not suitable for industrial application. Meanwhile the low-grade zinc oxide ore utilization process in the prior art has problems such as high energy consumption, low beneficiation recovery rate, serious environmental pollution, and low economic value, etc. The present invention proposes a new treatment process to solve one or more problems in the prior art, for example the lack of a preparation process of calcium zincate suitable for industrial use, or the lack of economical and effective use of low-grade zinc ore.

Solution to the Problem(s)

In order to solve the problems in the prior art, the present disclosure provides a method for producing calcium zincate, comprising the following steps:

leaching step: mixing and stirring a finely ground zinc-containing raw material with a leaching agent, and then filtering to obtain a leachate, wherein the leaching agent is a mixed aqueous solution of ammonia and ammonium bicarbonate, or a mixed aqueous solution of ammonia and ammonium carbonate, or a mixed aqueous solution of ammonia, ammonium bicarbonate and ammonium carbonate;

optionally, purifying the leachate obtained in the leaching step;

decarbonization step: adding calcium oxide and/or calcium hydroxide into the leachate, stirring and filtering to obtain a first solid and a first filtrate;

calcium zincate synthesis step: adding calcium hydroxide and/or calcium oxide into the first filtrate, stirring for reaction, and filtering to obtain a second solid and a second filtrate;

optionally, rinsing the second solid with water;

drying step: drying the second solid to obtain a calcium zincate final product.

In the method for producing calcium zincate provided by a further embodiment of the present disclosure:

in the calcium zincate synthesis step, before adding calcium hydroxide and/or calcium oxide into the first filtrate, an active agent is added to the first filtrate;

the average particle size of the calcium zincate final product is 10~100 nm.

In the method for producing calcium zincate provided by a further embodiment of the present disclosure, the mass concentration of total ammonia in the leaching agent is 5%~15%, and the molar concentration of effective carbonate in the leaching agent is:

$$C_{leaching\ agent\ carbonate} = (n_{total\ zinc\ in\ raw\ material} - n_{zinc\ carbonate\ in\ raw\ material}) \times a / V_{leaching\ agent},$$

where:

$C_{leaching\ agent\ carbonate}$ is the molar concentration of effective carbonate in the leaching agent, $n_{total\ zinc\ in\ raw\ material}$ is the amount of zinc element in the zinc-containing raw materials, $n_{zinc\ carbonate\ in\ raw\ material}$ is the amount of zinc carbonate in the zinc-containing raw materials, $V_{leaching\ agent}$ is the volume of the leaching agent, the value of a ranges from 100% to 600%, preferably 150% to 250%.

In the method for producing calcium zincate provided by a further embodiment of the present disclosure, in the leachate obtained in the leaching step, the concentration of zinc-ammine complex ions (based on the mass of the zinc element) is 10~25 g/L.

In the method for producing calcium zincate provided by a further embodiment of the present disclosure, the amount of calcium oxide and/or calcium hydroxide added in the decarbonization step is 100% to 130%, preferably 100% to 110% of the amount of effective carbonate in the leachate.

In the method for producing calcium zincate provided by a further embodiment of the present disclosure, in the calcium zincate synthesis step, the ratio of the amount of calcium hydroxide and/or calcium oxide added to the first filtrate to the amount of zinc-ammine complex ion in the first filtrate is 1~1.2:2, preferably 1~1.1:2.

In the method for producing calcium zincate provided by a further embodiment of the present disclosure, carbon dioxide is introduced into the second filtrate obtained in the calcium zincate synthesis step, and the second filtrate introduced with the carbon dioxide is used as leaching agent to be recycled for the leaching of zinc-containing raw materials.

In the method for producing calcium zincate provided by a further embodiment of the present disclosure, the reaction temperature of the calcium zincate synthesis step is 15~90° C., preferably 30~60° C., or preferably 15~25° C.

In the method for producing calcium zincate provided by a further embodiment of the present disclosure, the time of stirring for reaction in the calcium zincate synthesis step is 15~30 minutes.

In the method for producing calcium zincate provided by a further embodiment of the present disclosure, the active agent is one or more selected from sodium hexametaphosphate and sodium dodecylbenzene sulfonate.

Effect of the Invention

The present disclosure achieves one or more of the following advantageous technical effects:

1) The present disclosure enables the synthesis of calcium zincate in a zinc ammine environment for the first time. The present disclosure synthesizes calcium zincate from zinc ammine complex ion, the selective crystallization and separation of zinc element is achieved through equilibrium shift of zinc ammine complex ions, and calcium zincate is specifically generated. The reaction is highly adaptable, simple and rapid, and it does not require seed crystals. A high-purity calcium zincate product is obtained in an ammonia environment through a simple process, which is suitable for industrial production, and has high comprehensive economic benefits.

2) The method provided by the present disclosure enables the production of calcium zincate starting from low-grade zinc ore, which is cheap raw materials with low purity and multiple impurities. The combination of wet leaching and synthesis process enables the economic and environmental-friendly utilization of ultra-low-grade zinc ore.

3) The method of the present disclosure has a wide application range. The ammonia-ammonium bicarbonate leaching system can effectively extract and utilize various forms of zinc-containing raw materials.

4) The calcium zincate synthesis method of the present disclosure has mild reaction condition. It creatively adds calcium oxide or calcium hydroxide into the ammonium bicarbonate—zinc ammine complex system to make the equilibrium shift of zinc ammine complex—zinc ion—calcium zincate occur. The selective crystallization and separation of zinc elements are achieved through the principle of equilibrium shift without destroying the ammonia environment of the solution, and a calcium zincate product with high added value is obtained. Differ from the traditional method where zinc ions are crystalized and separated through destroying the complex environment by heat distillation of ammonia, the process of the present disclosure does not require ammonia distillation, which is simple and easy to implement. It greatly reduces the energy consumption of the process, and avoids the problems in ammonia distillation process, such as co-precipitation of impurities due to damage of ammonia environment, safety risks brought by high temperature and high pressure, and corrosion of the equipment.

5) The method of the present disclosure solves the problems in recovery rate and product grade. The calcium zincate obtained in the process can be used directly as a product or as an industrial raw material, and has good economic benefits.

6) The method of the present disclosure has low pollution, and the auxiliary materials can be recycled. It solves the problem of environmental pollution caused by auxiliary materials in the prior zinc raw material processing process.

DESCRIPTION OF EMBODIMENTS

Various exemplary embodiments, features, and aspects of the present disclosure will be described in detail below. The dedicated word "exemplary" here means "serving as an example, embodiment, or illustration." Any embodiment described herein as "exemplary" need not be construed as being superior or better than other embodiments.

In addition, in order to better explain the present disclosure, numerous specific details are given in the following specific embodiments. In some examples, the methods, means, reagents, and equipment well-known to those skilled in the art have not been described in detail, but those skilled in the art can implement the technical solutions of the present disclosure based on general knowledge in the art.

The scope of application of the method in the present disclosure is not particularly limited, and can be widely applied to the utilization of various zinc-containing raw materials. When low-grade zinc oxide ore is used as a raw material for production, the advantages of the method disclosed herein are particularly prominent. For example, low-grade zinc-containing ore may be zinc-containing ore with a zinc content of 3%~15%; in particular, prior to this disclosure, zinc-containing ore with a zinc content of 3%~6% (lean ore, beneficiation tailings) are stored in large quantities, and the existing processes cannot achieve economically valuable utilization of them, causing great processing pressure. The method of the present disclosure not only technically enables the effective utilization of such low-grade zinc-containing raw material, but is also simple and easy, with low cost and high economic value.

In the present disclosure, the form of the zinc component exist in the zinc-containing raw ore is not particularly limited. For example, the zinc component may exist in one or more forms including but not limited to zinc oxide, zinc carbonate, zinc silicate, and the like.

Glossary

In this article, unless otherwise specified, "zinc ammine carbonate" is the general term for the compound formed by zinc ammine complex and carbonate, including $[Zn(NH_3)_4]CO_3$ (zinc tetraammine carbonate), $[Zn(NH_3)_3]CO_3$ (zinc triammine carbonate), $[Zn(NH_3)_2]CO_3$ (zinc diammine carbonate), $[Zn(NH_3)]CO_3$ (zinc monoammine carbonate), etc.

In this article, unless otherwise specified, "zinc ammine complex ion" is the general term for various zinc ammine complex ions, including $[Zn(NH_3)_4]^{2+}$ (zinc tetraammine ion), $[Zn(NH_3)_3]^{2+}$ (zinc triammine ion), $[Zn(NH_3)_2]^{2+}$ (zinc diammine ion), $[Zn(NH_3)]^{2+}$ (zinc monoammine ion), etc.

In this article, unless otherwise specified, the "effective carbonate" in a solution (including but not limited to various liquids such as leaching agent and leachate) refers to the sum of carbonate and bicarbonate in the solution.

"Optional" or "optionally" means that the subsequent steps may be performed or may not be performed, and the expression includes the circumstance where the subsequent steps are performed and the circumstance where the subsequent steps are not performed.

Chemical Reaction Formula

1. Leaching
a. Leaching of Zinc Oxide
Using ammonia and ammonium bicarbonate as leaching agent:

$$ZnO+(i-1)NH_3+NH_4HCO_3=[Zn(NH_3)_i]CO_3+H_2O$$

(i is an integer from 1 to 4)
Using ammonia and ammonium carbonate as leaching agent:

$$ZnO+(i-2)NH_3+(NH_4)_2CO_3=[Zn(NH_3)_i]CO_3+H_2O$$

(i is an integer from 2 to 4)
b. Leaching of Zinc Hydroxide
Using ammonia and ammonium bicarbonate as leaching agent:

$$Zn(OH)_2+(i-1)NH_3+NH_4HCO_3=[Zn(NH_3)_i]CO_3+2H_2O$$

(i is an integer from 1 to 4)
Using ammonia and ammonium carbonate as leaching agent:

$$Zn(OH)_2+(i-2)NH_3+(NH_4)_2CO_3=[Zn(NH_3)_i]CO_3+2H_2O$$

(i is an integer from 2 to 4)
c. Leaching of Zinc Carbonate (Smithsonite)

$$ZnCO_3+iNH_3=[Zn(NH_3)_i]CO_3$$

(i is an integer from 1 to 4)
d. Leaching of Zinc Silicate
Using ammonia and ammonium bicarbonate as leaching agent:

$$ZnSiO_3+(i-1)NH_3+NH_4HCO_3=[Zn(NH_3)_i]CO_3+H_2O+SiO_2$$

(i is an integer from 1 to 4)

Using ammonia and ammonium carbonate as leaching agent:

$$ZnSiO_3+(i-2)NH_3+(NH_4)_2CO_3=[Zn(NH_3)_i]CO_3+H_2O+SiO_2$$

(i is an integer from 2 to 4)
2. Decarbonization
Reaction of lime with water:

$$CaO+H_2O=Ca(OH)_2$$

Precipitation:

$$Ca(OH)_2+(NH_4)_2CO_3=CaCO_3\downarrow+2NH_3\cdot H_2O$$

$$Ca(OH)_2+NH_4HCO_3=CaCO_3\downarrow+NH_3+2H_2O$$

$$[Zn(NH_3)_i]CO_3+Ca(OH)_2=[Zn(NH_3)_i](OH)_2+CaCO_3\downarrow$$

(i is an integer from 1 to 4)
Possible side reaction:

$$Ca(OH)_2+[Zn(NH_3)_i]CO_3=CaCO_3\downarrow+Zn(OH)_2\downarrow+iNH_3$$

(i is an integer from 1 to 4)
3. Synthesis of Calcium Zincate:

$$2[Zn(NH_3)_i](OH)_2+Ca(OH)_2+2H_2O=Ca(OH)_2\cdot2Zn(OH)_2\cdot2H_2O+2iNH_3$$

(i is an integer from 1 to 4)

Detailed Steps

Step 1: Leaching

The finely ground zinc-containing raw materials and the prepared leaching agent are mixed in a certain ratio for stirring and leaching. The leaching agent can be selected from: a mixed aqueous solution of ammonia and ammonium bicarbonate; a mixed aqueous solution of ammonia and ammonium carbonate; a mixed aqueous solution of ammonia, ammonium bicarbonate and ammonium carbonate. The zinc-containing raw material is not particularly limited. For example, it may be a zinc-containing raw ore, especially a low-grade zinc-containing raw ore.

The concentration of total ammonia and the concentration of effective carbonate in the leaching agent are not particularly limited. Those skilled in the art can make selections according to the factors such as the components and grade of the raw material, in combination with actual needs.

In a preferred scheme, the mass concentration of total ammonia in the leaching agent is 5%~15%, more preferably 6%~8%. The preferred concentration range may achieve sufficient extraction effect and avoid waste and environmental issues caused by excessive ammonia.

In a preferred scheme, the amount of effective carbonate in the leaching agent is based on the difference between the amount of theoretical carbonate consumption of complexed zinc minus the amount of carbonate carried by zinc carbonate in the raw material, with 0~500% of increase. More preferably, the amount of effective carbonate in the leaching agent is based on the difference between the amount of theoretical carbonate consumption of complexed zinc minus the amount of carbonate carried by zinc carbonate in the raw material, with 50%~150% of increase. The amount of theoretical carbonate consumption of complex zinc refers to the amount of carbonate consumed to completely convert the zinc element in the raw material into zinc ammine carbonate. Therefore, the molar concentration of effective carbonate in the leaching agent can be calculated as follows:

$$C_{leaching\ agent\ carbonate}=(n_{total\ zinc\ in\ raw\ material}-n_{zinc\ carbonate\ in\ raw\ material})\times a/V_{leaching\ agent},$$

where $C_{leaching\ agent\ carbonate}$ is the molar concentration of effective carbonate in the leaching agent, $n_{total\ zinc\ in\ raw\ material}$ is the amount of zinc element in the zinc-containing raw materials, $n_{zinc\ carbonate\ in\ raw\ material}$ is the amount of zinc carbonate in the zinc-containing raw materials, $V_{leaching}$ the volume of the leaching agent, a is a coefficient, the value of a is 100%~600%, preferably 150%~250%. The mass concentration of carbonate in the leaching agent can be converted according to the molar concentration.

The preferred concentration of effective carbonate in the leaching agent may achieve a complete leaching of the zinc from the raw material, enable the circulation of carbonate in the process, and avoid the pressure caused by the excessive carbonate on the subsequent processing.

The weight ratio of the leaching agent to the zinc-containing raw material (for example, zinc-containing raw ore powder) is not particularly limited, as long as the zinc component can be leached. Preferably, the weight ratio of the leaching agent to the zinc-containing raw material is 3:1 to 5:1, which can obtain a satisfactory extraction effect and avoid the waste of the extractant.

The temperature for leaching is not particularly limited, as long as the zinc component in the zinc-containing raw material (for example, zinc-containing raw ore powder) is leached. Preferably, the leaching is carried out at room temperature, for example at 15~30° C.; it can also be carried out at a slightly higher temperature (for example, 30~55° C.). The appropriate temperature can also be selected according to actual conditions.

The zinc-containing raw material (such as zinc-containing raw ore powder) and the leaching agent are mixed and stirred. The stirring time is not particularly limited, as long as the zinc component in the raw material is leached. The stirring time is preferably 1 to 4 hours, more preferably 1~2 hours.

In the process of leaching, the zinc element in the raw material is converted into zinc ammine complex ions (mainly various zinc ammine complex ions) and introduced into the liquid phase. After leaching, filtering is performed to obtain a leachate containing zinc ammine complex ions. The leachate can be used in the subsequent decarbonization process. The concentration of zinc ammine complex ions in the leachate is not particularly limited, but it is preferred that the concentration of zinc ammine complex ions in the leachate (based on the mass of zinc element) is 10~25 g/L, which can optimize the efficiency of the process, obtain favorable yield and purity in the subsequent calcium zincate synthesis step, and achieve the best comprehensive economic benefits. If the concentration of zinc ammine complex ions in the original leachate is not within the preferred range, the leachate can also be optionally concentrated or diluted to adjust the concentration of zinc ammine complex ions in the leachate to a preferred range of 10~25 g/L.

Step 2: Purifying

Step 2 is an optional step. Step 2 is performed if necessary. The leaching solution is purified according to common methods to remove impurities such as iron, manganese, lead, and copper. An exemplary purification method is to add zinc powder for replacement and then filter to remove heavy metal pollutants, but various other known purification methods can also be used. The purification step helps to increase the purity of the final product.

Step 3: Decarbonization

In the decarbonization step, calcium hydroxide and/or calcium oxide are added into the leachate containing zinc ammine complex ions to convert the carbonate/bicarbonate in the leachate into calcium carbonate. If the concentration of zinc ammine complex ions in the leachate is too high, the equilibrium shift of zinc ammine complex ion—zinc ion—zinc hydroxide in the leachate may occur at the same time, and a very small part of the zinc component may co-precipitate with calcium carbonate in the form of zinc hydroxide.

In the decarbonization step, the addition amount of calcium hydroxide and/or calcium oxide roughly matches the content of effective carbonate in the leachate. For example, the amount of calcium hydroxide and/or calcium oxide added in the decarbonization step is 100% to 130%, more preferably 100% to 110% of the amount of effective carbonate in the leachate. Appropriate addition of calcium hydroxide and/or calcium oxide helps to control the process cost and also helps to improve the purity and quality of the finished zinc product.

In the decarbonization step, calcium hydroxide and/or calcium oxide are added to the leaching solution, stirred for reaction, and solid precipitates are generated. The reaction temperature is not particularly limited, and it is particularly preferable to perform the reaction at room temperature (for example, 15~25° C.), which saves energy on the one hand and reduces environmental pollution caused by ammonia volatilization on the other hand. The stirring time is not particularly limited as long as precipitation is obtained, preferably 1~2 hours.

Filtration is performed after stirring to obtain the first solid and the first filtrate. The main component of the first solid is calcium carbonate. If the concentration of zinc ammine complex ions in the leachate is relatively high, some zinc hydroxide co-precipitated with calcium carbonate may also be present in the first solid. The first solid can be calcined into calcium oxide and carbon dioxide for recycling. The first filtrate is used for the subsequent calcium zincate synthesis.

Step 4: Calcium Zincate Synthesis

Calcium hydroxide and/or calcium oxide are added to the first filtrate and stirred for reaction. The ratio of the amount of calcium hydroxide and/or calcium oxide added in this step to the amount of zinc ammine complex ions in the first filtrate is preferably 1~1.2:2, more preferably 1~1.1:2. The reaction temperature is not particularly limited, and it can be, for example, 15~90° C., preferably 20~90° C., and more preferably 30~60° C.; the reaction temperature at room temperature (15~25° C.) is also preferred. Such temperature range is advantageous in the aspects that heating is not required, energy is saved, and environmental pollution due to ammonia volatilization is reduced. It is preferable to carry out filtration after 0.5~2 hours (more preferably 0.5~1 hour) of reaction, without long-term reaction and aging process. Filtration is then performed to obtain the second solid and the second filtrate. The main component of the second solid is calcium zincate. Generally, the calcium zincate component can account for more than 95% of the total mass of the second solid. In addition, the second filtrate can be introduced with carbon dioxide, then recycled for the leaching of zinc-containing raw materials.

In particular, if it is desired to control the particle size of the calcium zincate product, in this step, an active agent can be added into the first filtrate, then calcium hydroxide and/or calcium oxide are added, and the reaction is carried out with stirring. The active agent is preferably sodium hexametaphosphate or sodium dodecylbenzene sulfonate. The amount of the active agent is preferably 0.01~0.05% of the estimated mass of the final product. The reaction temperature is particularly preferably ambient temperature (15~25° C.). A relatively low temperature is more favorable to control the grain size. Another alternative way to control the grain size is to perform filtration right after 15~30 minutes of stirring, without long-term reaction and aging process.

Step 5: Rinsing

This step is an optional step. The rinsing step is performed if necessary. The second solid is rinsed with water at a liquid-solid ratio of 5~10:1 for 1~2 times.

Step 6: Drying

The second solid is dried at a temperature not higher than 125° C. to obtain the final product with calcium zincate as the main component. If one or more measurements such as addition of active agent, reaction at room temperature, and controlling the stirring reaction time is/are adopted in the calcium zincate synthesis step, the final product with nanoscale calcium zincate as the main component can be obtained, whose average particle size is 10~100 nm.

The embodiments of the present disclosure will be described in detail below in conjunction with examples, but those skilled in the art will understand that the following examples are only used to illustrate the present disclosure and should not be regarded as limiting the scope of the present disclosure. If specific conditions are not indicated in the examples, it shall be carried out in accordance with conventional conditions or conditions recommended by the manufacturer. The reagents or instruments used without the manufacturer's indication are all conventional products that are commercially available.

Example 1

A zinc ore from Yunnan has a zinc content of 5.6% and a raw ore oxidation rate of 96.3%. The zinc content in this ore is mainly zinc carbonate.

Three hundred grams of zinc-containing raw ore was taken and placed into 900 ml of ammonia-ammonium bicarbonate mixed solution (with total ammonia mass concentration of 10%, and carbonate mass concentration of 3%) for stirring and leaching. The leaching temperature was ambient temperature, and the stirring time was 2 hours. Filtration was then performed. The liquid obtained after filtration contained 1.632% of zinc (based on zinc oxide equivalent). The mass concentration of carbonate in the liquid was 4.23%. The increased part of carbonate was brought from the zinc carbonate in the raw ore. According to the test data, the recovery rate of soluble zinc component in the raw ore in the leaching process was 90.79%, and the total zinc recovery rate was 87.43%.

The zinc ammine complex solution obtained from filtration was purified.

Six hundred milliliters of zinc ammine complex solution obtained from leaching and filtration was taken, and 14.55 g of calcium oxide was added for precipitating carbonate. Filtration was performed after 1 h of reaction.

Five hundred milliliters of the filtered liquid was taken, and 2.45 g of calcium hydroxide was added for the synthesis of calcium zincate. The reaction was performed at room temperature with stirring. Filtration was performed after 1 hour of reaction. The filtered solid was dried at 105° C. for 2 hours, and samples were taken. The analysis showed that the content of calcium zincate in the solid was 99.65%.

Example 2

A zinc ore from Chongqing has a zinc content of 4.7% and a raw ore oxidation rate of 95.52%. The zinc content in this ore is mainly zinc silicate.

Three hundred grams of zinc-containing raw ore was taken and placed into 900 ml of ammonia-ammonium bicarbonate mixed solution (with total ammonia mass concentration of 10%, and carbonate mass concentration of 3%) for stirring and leaching. The leaching temperature was ambient temperature, and the stirring time was 2 hours. Filtration was then performed. The liquid obtained after filtration contained 1.367% of zinc (based on zinc oxide equivalent). The mass concentration of carbonate in the liquid was 3.54%. The increased part of carbonate was brought from the zinc carbonate in the raw ore. According to the test data, the recovery rate of soluble zinc component in the raw ore in the leaching process was 91.35%, and the total zinc recovery rate was 87.26%.

The zinc ammine complex solution obtained from filtration was purified.

Six hundred milliliters of zinc ammine complex solution obtained from leaching and filtration was taken, and 12.18 g of calcium oxide was added for precipitating carbonate. Filtration was performed after 1 h of reaction.

Five hundred milliliters of the filtered liquid was taken, and 2 g of calcium hydroxide was added for the synthesis of calcium zincate. The reaction was performed at room temperature with stirring. Filtration was performed after 1 hour of reaction. The filtered solid was dried at 105° C. for 2 hours, and samples were taken. The analysis showed that the content of calcium zincate in the solid was 99.49%.

Example 3

A zinc ore from Yunnan has a zinc content of 5.6% and a raw ore oxidation rate of 96.3%. The zinc content in this ore is mainly zinc carbonate.

Three hundred grams of zinc-containing raw ore was taken and placed into 900 ml of ammonia-ammonium bicarbonate mixed solution (with total ammonia mass concentration of 10%, and carbonate mass concentration of 3%) for stirring and leaching. The leaching temperature was ambient temperature, and the stirring time was 2 hours. Filtration was then performed. The liquid obtained after filtration contained 1.632% of zinc (based on zinc oxide equivalent). The mass concentration of carbonate in the liquid was 4.23%. The increased part of carbonate was brought from the zinc carbonate in the raw ore. According to the test data, the recovery rate of soluble zinc component in the raw ore in the leaching process was 90.79%, and the total zinc recovery rate was 87.43%.

The zinc ammine complex solution obtained from filtration was purified.

Six hundred milliliters of zinc ammine complex solution obtained from leaching and filtration was taken, and 14.55 g of calcium oxide was added for precipitating carbonate. Filtration was performed after 1 h of reaction.

Five hundred milliliters of the filtered liquid was taken, 3 g of sodium dodecylbenzene sulfonate was added, then 2.45 g of calcium hydroxide was added for the synthesis of calcium zincate. The reaction was performed at room temperature with stirring. Filtration was performed after 0.5 hour of reaction. The filtered solid was dried at 105° C. for 2 hours, and samples were taken. The analysis showed that the content of calcium zincate in the solid was 99.65%, and the average particle size was 37.1 nm.

Example 4

A zinc ore from Chongqing has a zinc content of 4.7% and a raw ore oxidation rate of 95.52%. The zinc content in this ore is mainly zinc silicate.

Three hundred grams of zinc-containing raw ore was taken and placed into 900 ml of ammonia-ammonium bicarbonate mixed solution (with total ammonia mass concentration of 10%, and carbonate mass concentration of 3%) for stirring and leaching. The leaching temperature was ambient temperature, and the stirring time was 2 hours. Filtration was then performed. The liquid obtained after filtration contained 1.367% of zinc (based on zinc oxide equivalent). The mass concentration of carbonate in the liquid was 3.54%. The increased part of carbonate was brought from the zinc carbonate in the raw ore. According to the test data, the recovery rate of soluble zinc component in the raw ore in the leaching process was 91.35%, and the total zinc recovery rate was 87.26%.

The zinc ammine complex solution obtained from filtration was purified.

Six hundred milliliters of zinc ammine complex solution obtained from leaching and filtration was taken, and 12.18 g of calcium oxide was added for precipitating carbonate. Filtration was performed after 1 h of reaction.

Five hundred milliliters of the filtered liquid was taken, 3 g of sodium dodecylbenzene sulfonate was added, then 2 g of calcium hydroxide was added for the synthesis of calcium zincate. The reaction was performed at room temperature with stirring. Filtration was performed after 0.5 hour of reaction. The filtered solid was dried at 105° C. for 2 hours, and samples were taken. The analysis showed that the content of calcium zincate in the solid was 99.49%, and the average particle size was 42.3 nm.

The embodiments of the present disclosure have been described above, the above description is exemplary, not exhaustive, and is not limited to the disclosed embodiments. Without departing from the scope and spirit of the illustrated embodiments, many modifications and changes are obvious to those of ordinary skill in the art. The choice of terms used herein is intended to best explain the principles, practical applications, or technical improvements in the market of each embodiment, or to enable other ordinary skilled in the art to understand the various embodiments disclosed herein.

The invention claimed is:

1. A method for producing calcium zincate comprising:
leaching step: mixing and stirring a finely ground zinc-containing raw material with a leaching agent, and then filtering to obtain a leachate, where the leaching agent is a mixed aqueous solution of ammonia and ammonium bicarbonate, or a mixed aqueous solution of ammonia and ammonium carbonate, or a mixed aqueous solution of ammonia, ammonium bicarbonate and ammonium carbonate;
optionally, purifying the leachate obtained in the leaching step;
decarbonization step: adding calcium oxide and/or calcium hydroxide into the leachate, stirring and filtering to obtain a first solid and a first filtrate;
calcium zincate synthesis step: adding calcium hydroxide and/or calcium oxide into the first filtrate, stirring for reaction, and filtering to obtain a second solid and a second filtrate;
optionally, rinsing the second solid with water; and
drying step: drying the second solid to obtain a calcium zincate final product.

2. The method for producing calcium zincate according to claim 1, wherein:
in the calcium zincate synthesis step, before adding calcium hydroxide and/or calcium oxide into the first filtrate, an active agent is added to the first filtrate;
the average particle size of the calcium zincate final product is 10~100 nm.

3. The method for producing calcium zincate according to claim 2, wherein the mass concentration of total ammonia in the leaching agent is 5%~15%, and the molar concentration of effective carbonate in the leaching agent is:

$$C_{leaching\ agent\ carbonate} = (n_{total\ zinc\ in\ raw\ material} - n_{zinc\ carbonate\ in\ raw\ material}) \times a / V_{leaching\ agent},$$

where:
$C_{leaching\ agent\ carbonate}$ is the molar concentration of effective carbonate in the leaching agent,
$n_{total\ zinc\ in\ raw\ material}$ is the amount of zinc element in the zinc-containing raw materials,
$n_{zinc\ carbonate\ in\ raw\ material}$ is the amount of zinc carbonate in the zinc-containing raw materials,
$V_{leaching\ agent}$ is the volume of the leaching agent,
the value of a ranges from 100% to 600%.

4. The method for producing calcium zincate according to claim 3, wherein: in the leachate obtained in the leaching step, the concentration of zinc-ammine complex ions is 10~25 g/L based on the mass of the zinc element.

5. The method for producing calcium zincate according to claim 4, wherein the amount of calcium oxide and/or calcium hydroxide added in the decarbonization step is 100% to 130% of the amount of effective carbonate in the leachate.

6. The method for producing calcium zincate according to claim 5, wherein in the calcium zincate synthesis step, the ratio of the amount of calcium hydroxide and/or calcium oxide added to the first filtrate to the amount of zinc-ammine complex ion in the first filtrate is 1~1.2:2.

7. The method for producing calcium zincate according to claim 6, wherein carbon dioxide is introduced into the second filtrate obtained in the calcium zincate synthesis step, and the second filtrate introduced with carbon dioxide is used as leaching agent to be recycled for the leaching of zinc-containing raw materials.

8. The method for producing calcium zincate according to claim 7, wherein the reaction temperature of the calcium zincate synthesis step is 15~90° C.

9. The method for producing calcium zincate according to claim 2, wherein the time of stirring for reaction in the calcium zincate synthesis step is 15~30 minutes.

10. The method for producing calcium zincate according to claim 2, wherein the active agent is at least one selected from the group consisting of sodium hexametaphosphate and sodium dodecylbenzene sulfonate.

11. The method for producing calcium zincate according to claim 3, wherein the value of a ranges from 150% to 250%.

12. The method for producing calcium zincate according to claim 5, wherein the amount of calcium oxide and/or calcium hydroxide added in the decarbonization step is 100% to 110% of the amount of effective carbonate in the leachate.

13. The method for producing calcium zincate according to claim 6, wherein in the calcium zincate synthesis step, the ratio of the amount of calcium hydroxide and/or calcium oxide added to the first filtrate to the amount of zinc-ammine complex ion in the first filtrate is 1~1.1:2.

14. The method for producing calcium zincate according to claim 8, wherein the reaction temperature of the calcium zincate synthesis step is 30~60° C.

15. The method for producing calcium zincate according to claim 8, wherein the reaction temperature of the calcium zincate synthesis step is 15~25° C.

* * * * *